(12) United States Patent
Fliege et al.

(10) Patent No.: US 6,612,638 B1
(45) Date of Patent: Sep. 2, 2003

(54) LATERAL TARPAULIN SUSPENSION

(75) Inventors: Dieter Fliege, Remscheid (DE); Josef Drasch, Winzer (DE); Roger Remmel, Remscheid (DE)

(73) Assignee: Edscha LKW-Schiebeverdecke GmbH, Remscheid (DE)

( * ) Notice: Subject to any disclaimer, the term of this patent is extended or adjusted under 35 U.S.C. 154(b) by 0 days.

(21) Appl. No.: 09/786,144

(22) PCT Filed: Sep. 1, 1999

(86) PCT No.: PCT/DE99/02808

§ 371 (c)(1), (2), (4) Date: Jun. 29, 2001

(87) PCT Pub. No.: WO00/12373

PCT Pub. Date: Mar. 9, 2000

(30) Foreign Application Priority Data

Sep. 1, 1998 (DE) .................................... 198 39 824

(51) Int. Cl.$^7$ .................................................. B60J 5/06
(52) U.S. Cl. .................... 296/138; 296/155; 160/196.1; 16/87.6 R; 49/411
(58) Field of Search ................................. 296/138, 143, 296/144, 155, 141, 142; 160/196.1; 16/87.4 R, 87.6 R, 94 R, 98, 106; 49/411

(56) References Cited

U.S. PATENT DOCUMENTS

| | | | | |
|---|---|---|---|---|
| 2,465,621 A | | 3/1949 | Wheeler ................... 248/361 |
| 3,585,674 A | * | 6/1971 | Golden .................... 16/87.6 R |
| 3,636,588 A | * | 1/1972 | Ferris ......................... 16/94 R |
| 3,936,906 A | * | 2/1976 | Takazawa ................. 16/87.4 R |
| 4,943,110 A | * | 7/1990 | Pastva ......................... 296/138 |
| 5,282,663 A | * | 2/1994 | Horton ........................ 296/138 |
| 5,429,408 A | * | 7/1995 | Henning et al. ....... 296/100.12 |
| 5,472,300 A | * | 12/1995 | Lipschitz ................... 296/24.1 |
| 2001/0042994 A1 | * | 11/2001 | Than .......................... 296/143 |

FOREIGN PATENT DOCUMENTS

| | | | | |
|---|---|---|---|---|
| EP | 554132 A1 | * | 8/1993 | ................. 296/155 |
| GB | 1262880 | * | 2/1972 | ................. 296/138 |
| GB | 2079684 A | * | 1/1982 | ................. 296/138 |

* cited by examiner

*Primary Examiner*—D. Glenn Dayoan
*Assistant Examiner*—Jason Morrow
(74) *Attorney, Agent, or Firm*—Davidson, Davidson & Kappel, LLC

(57) ABSTRACT

A folding top for a commercial vehicle includes a folding top frame, bows supporting a roof covering, and side tarpaulins suspended by means of hanging sliders. The folding-top frame includes upper longitudinal flanges spanning at least part of the length of a loading compartment of the vehicle. The frame is supported against a chassis of the vehicle via upwardly protruding supports and stakes. The bows are supported on the upper longitudinal flanges and displaceable in a longitudinal direction of the vehicle. The side tarpaulins are suspended via the hanging sliders in a longitudinally displaceable manner on assigned running tracks of the upper longitudinal flanges. Each of the hanging sliders includes a fastening plate for connecting one of the side tarpaulins. The fastening plate is of two-part design and includes a first part connected to the slider and a second part connected to an upper end of the one of the side tarpaulins. The first part and the second part are adjustable relatively to each other counter to a resisting means.

22 Claims, 3 Drawing Sheets

LATERAL TARPAULIN SUSPENSION

BACKGROUND OF THE INVENTION

The present invention relates to a side-tarpaulin suspension means on folding tops for commercial vehicles, in particular folding tops which can be pushed together for vehicle bodies and containers.

In the case of known arrangements or suspension means, of side tarpaulins on folding tops for vehicle bodies, in particular also folding tops that can be pushed together for vehicle bodies, provision is typically made for the side tarpaulins to be suspended in a manner such that they can be displaced in the longitudinal direction of the side wall of the vehicle. Such side tarpaulins are typically suspended via hanging sliders which are additionally suspended in most cases by means of two partially spherical rollers in complementarily designed running tracks of the upper longitudinal members of the folding-top frame. The side tarpaulins are usually tensioned via tensioning devices which engage at their lower end or at least interact with engagement means arranged at their lower end, in order to prevent the side tarpaulins from billowing out when the vehicle is being driven. The known tensioning means, which engage in the lower region of the side tarpaulins, may be associated with a considerable effort having to be made by the operator. Alternatively, they may be associated with a relatively high outlay on production if the conditions stipulated for particular transport systems have to be met, for example, the so called piggy-back transportation of European railways conditions.

SUMMARY OF THE INVENTION

It is an object of the present invention to provide a side-tarpaulin suspension means which, with a simple suspension means, makes possible a favorable tensioning device for the side-wall tarpaulins of a vehicle body.

According to the invention, this object may be achieved in the case of the side-tarpaulin suspension means mentioned at the beginning in that the fastening plate is of two-part design, that the one part of the fastening plate is connected to the slider engaging in the running track of the upper longitudinal flange of the folding-top frame, and the other part of the fastening plate is connected to the tarpauling, and that the two parts of the fastening plate can be adjusted relative to each counter to a resisting means.

A side-tarpaulin suspension means is therefore provided which improves conventional designs for commercial vehicles, in particular in the case of designs for vehicle bodies and containers, to the effect that while the longitudinally displaceable side-wall tarpaulins still have a simple suspension means and simple manoeuvrabilty, an improved tensioning device, which is optimized with regard to the expenditure of energy associated therewith, for side-wall tarpaulins of a vehicle body is achieved.

The shifting of the means for tensioning and maintaining the tensioning of the side-wall tarpaulin from the lower end thereof to the upper end thereof first of all brings about a simplification of the manoeuvring of the side-wall tarpaulin as it is being opened and closed, since the side-wall tarpaulin now only has to be fastened by its lower end to the vehicle body and the tensioning then automatically arises from the spring forces acting at the upper end on the side-wall tarpaulin. Above all, the operator no longer needs to pay attention to maintaining and obtaining tensioning of the side-wall tarpaulin. Finally, the shifting of the device for tensioning and maintaining the tensioning of the side-wall tarpaulin from the lower, mnanoeuvrable end thereof to the upper end thereof also results in a simplification of the tensioning means. In particular, the means provided according to the invention for producing a resistance against a relative movement of the two parts of the fastening plate may be of completely different design and, for example, even formed by strips or blocks of an elastically deformable material.

In the case of a device for producing and maintaining tensioning in a side-wall tarpaulin of a vehicle body, provision is expediently made for the two parts of the fastening plate to be movable relative to each other counter to the load of a tension spring. The tension spring can advantageously be formed by a helical spring and can be fitted at one end to that part of the fastening plate which is connected to the slider and at the other end to that part of the fastening plate which is fastened to the tarpaulin, in each case by means of a hole recess and a partially annular end hook.

In order to obtain and ensure as frictionless as possible an adjustment of the two parts of a divided fastening plate even after relatively long operating times and exposure to the effects of environmental conditions, provision is preferably additionally made for the two parts which can be moved relative to each other of the fastening plate to be guided on each other, preferably by that part of the fastening plate which is connected to the slider being designed as a planar flat material blank which is provided with a central oblong recess and by that part of the fastening plate which is connected to the tarpaulin being of bracket-shaped design and being provided at least on one side with claws which grip behind the longitudinal edges of the oblong recess in that part which is connected to the slider.

In a further advantageous refinement, provision may further be made for the back surface, which is assigned to the fastening of the tarpaulin, of that part of the fastening plate which is to be connected to the tarpaulin to have an essentially triangular outline shape which tapers from the top downwards, and therefore with a design which in itself saves on weight to the greatest possible extent, for the greatest possible bearing surface to be ensured at least for the connection to the side-wall tarpaulin.

Provision can further expediently be made for the tarpaulin to be fastened in the region of its greatest width to a back surface of the part connected to the tarpaulin by means of a pressure-distribution plate and a riveted joint comprising at least two rivets.

As an alternative to this, it is, however, advantageously possible to design a side-wall-tarpaulin suspension means according to the invention in such a manner that the one part of the fastening plate which is connected to the tarpaulin and has an outline shape which tapers from the top downwards is designed such that it grips with its upper region around that part of the fastening plate which is connected to the slider and in this region is guided on the part of the fastening plate which is connected to the slider by means of an oblong recess in that leg region of its bracket shape which is set perpendicular to the plane of its back surface.

In connection with such a form of implementation, provision can then expediently furthermore be made for the recess which is arranged in the longitudinal centre of that part of the fastening plate which is connected to the slider and which has a width over the length of the bracket-shaped part which essentially corresponds in width to the diameter of the tension spring to be provided in its lower region with a widened portion.

Irrespective of the preferred form of implementation in each case, an advantageous manner of refinement resides in the fact that the slider which is connected to the one part of the fastening plate and is guided in the running track of the upper longitudinal flange of the folding-top frame comprises two rollers which are each partially spherical.

Further advantages and features of the invention emerge from the following description.

BRIEF DESCRIPTION OF THE DRAWINGS

The present invention is explained in greater detail below using a preferred exemplary embodiment and by reference to the attached drawings.

DETAILED DESCRIPTION OF A PREFERRED EMBODIMENT

Figure 1:
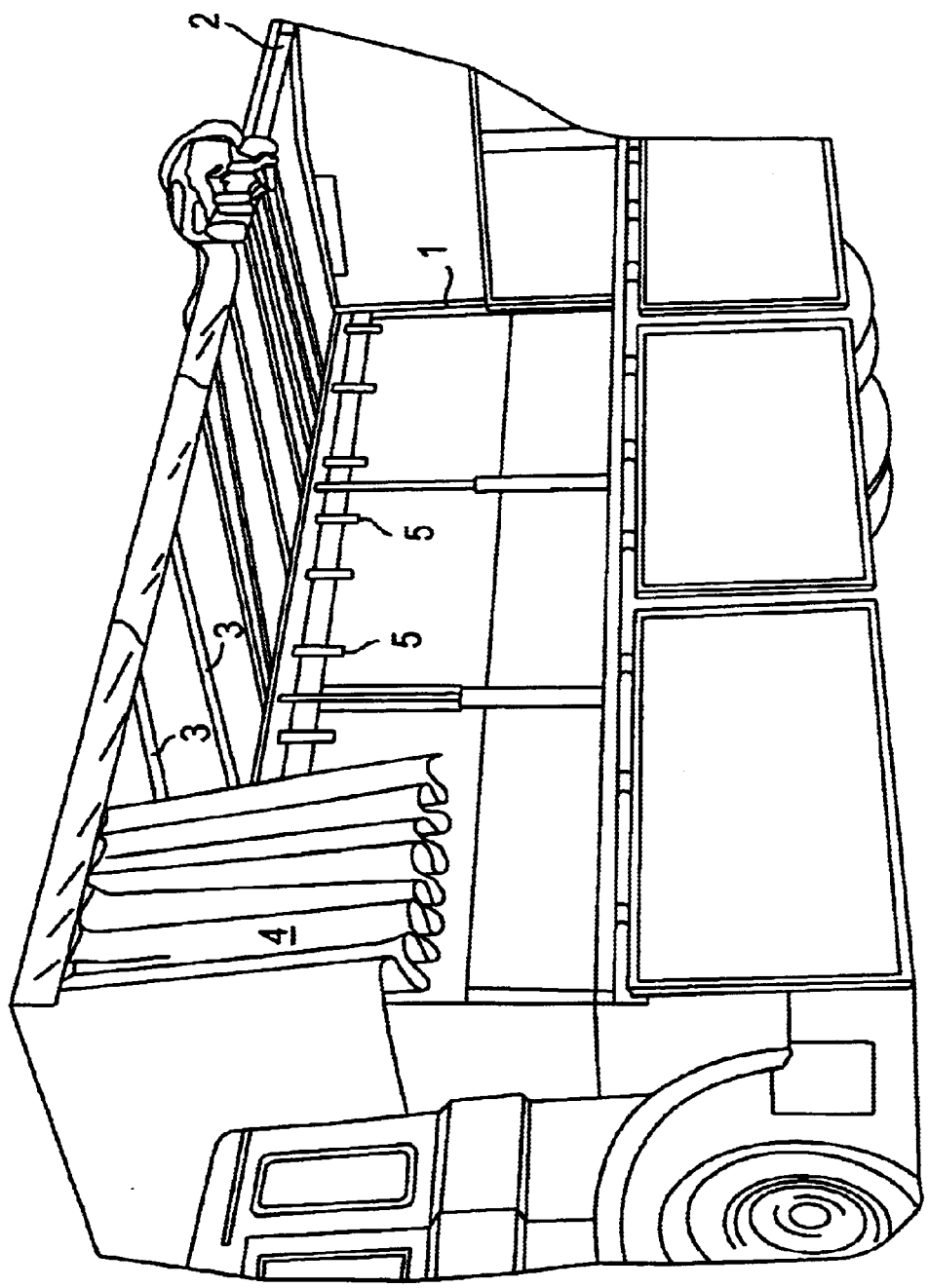
FIG. 1 shows a perspective view of a vehicle body provided with a tarpaulin structure.

In the case of a vehicle body which is merely illustrated schematically in FIG. 1 and is provided with a folding top which can be pushed together and side tarpaulins which can be pushed together, the folding-top frame primarily consists of upper longitudinal flanges 2 which span the length of the loading compartment and are supported against the vehicle chassis via upwardly protruding supports and stakes 1, the bows 3 which support a roof covering, in particular a tarpaulin, and, when the folding top is closed, at the same time effect transverse bracing of the upper region of the folding-top frame and can be displaced in the longitudinal direction of the vehicle, being supported on the upper longitudinal flanges 2. The upper longitudinal flanges 2 are suspended for their part via a number of stakes 1 which can be displaced longitudinally in the longitudinal direction of the vehicle, and the side tarpaulins 4 are suspended in a longitudinally displaceable manner on the upper longitudinal flanges 2. The suspension means for the side tarpaulin 4 on a folding-top frame of this type chiefly comprises hanging sliders 5 which are suspended in a longitudinally displaceable manner on assigned running tracks 7 of the upper longitudinal flanges 2 of the folding-top frame by means of rollers 6, and which are each connected to a side-wall tarpaulin 4 via a fastening plate 8.

The fastening plate 8 is basically of two-part design and comprises a first part 10 which is connected to the rollers 6 engaging in the running track 7 of the upper longitudinal flange 2 of the folding-top frame, and a second part 11 which is connected to the tarpaulin 4. The two parts 10 and 11 of the fastening plate 8 can be moved relative to each other counter to the load of a tension spring 12.

Figure 2:
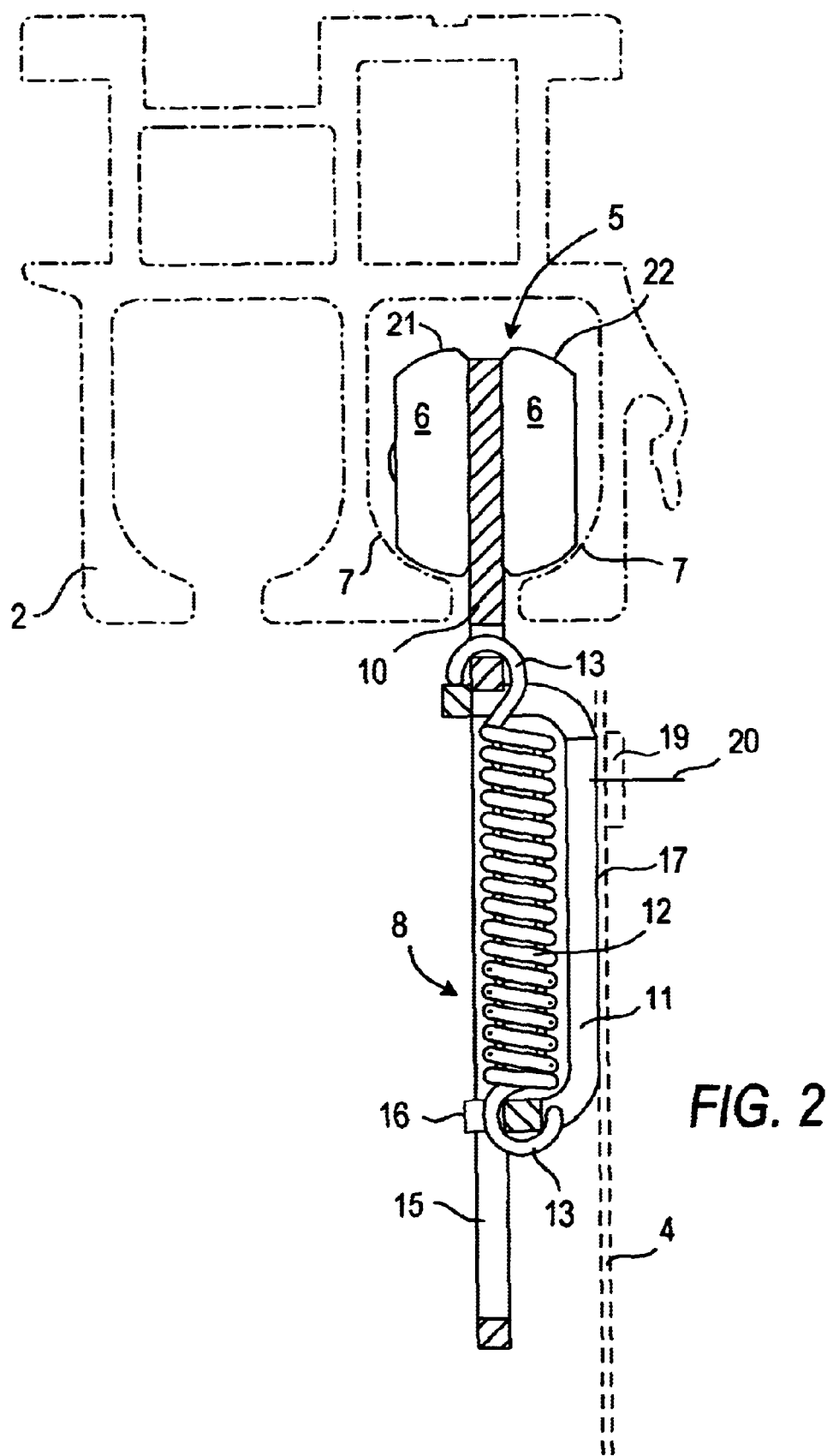
FIG. 2 shows a cross section of the upper region of a preferred exemplary embodiment of a side-tarpaulin suspension means according to the invention.
Figure 3:
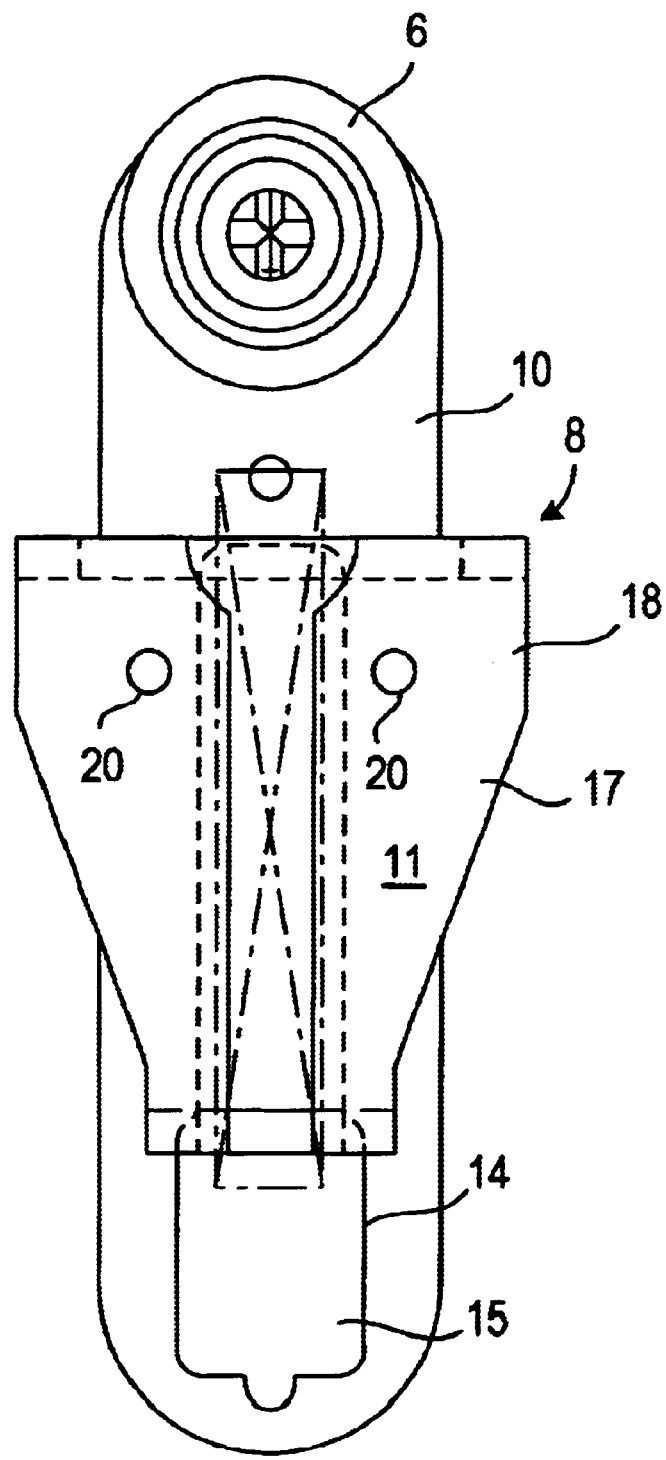
FIG. 3 shows a side view of the upper region of the side-tarpaulin suspension means of FIG. 2.

In the exemplary embodiment shown in particular in FIGS. 2 and 3, the tension spring 12 is formed by a helical spring which is fitted at one end to that part 10 of the fastening plate 8 which is connected to the slider and at the other end to that part 11 of the fastening plate 8 which is fastened to the tarpaulin 4, in each case by means of a partially annular end hook 13. Of the two parts 10 and 11 of the fastening plate 8 which are guided on each other and can be moved relative to each other, the part 10 which is connected to the slider is designed as a planar flat material blank which is provided with a central oblong recess 15, and that part 11 of the fastening plate 8 which is connected to the tarpaulin 4 is of bracket-shaped design. Furthermore, the part 11, which is of bracket-shaped design, is provided at least on one side with claws 16 which grip behind the longitudinal edges 14 of the oblong recess 15 in the part 10 which is connected to the slider.

The back surface 17, which is assigned to the fastening of the tarpaulin 4, of that part 11 of the fastening plate 8 which is to be connected to the tarpaulin 4 has an essentially triangular outline shape tapering from the top downwards. In the exemplary embodiment shown, that part 11 of the fastening plate 8 which is connected to the tarpaulin 4 is designed such that it grips in its upper region around that part of the fastening plate 8 which is connected to the slider and is guided in this region on that part 10 of the fastening plate 8 which is connected to the slider by means of an oblong recess in that leg region of its bracket shape which is set perpendicular to the plane of its back surface. The oblong recess 15 which is arranged in the longitudinal centre of the part 10 connected to the slider and has a width over the length of the bracket-shaped part 11 which corresponds in width to the diameter of the tension spring 12 is provided in its lower region with a widened portion 18.

The tarpaulin 4 is fastened in the region of its greatest width to the back surface of the part 10 connected to the tarpaulin 4 by means of a pressure-distribution plate 19 and a riveted joint comprising at least two rivets 20. The slider 5 which is connected to the one part 10 of the fastening plate 8 and is guided in the running track 7 of the upper longitudinal flange 2 of the folding-top frame comprises two rollers 21, 22 which are each partially spherical.

What is claimed is:

1. A folding top for a commercial vehicle, comprising:
   a folding-top frame having upper longitudinal flanges spanning at least part of the length of a loading compartment of said vehicle, said frame being supported against a chassis of said vehicle via upwardly protruding supports and stakes, and side tarpaulins suspended by means of hanging sliders in a longitudinally displaceable manner on assigned running tracks of said upper longitudinal flanges, each of said hanging sliders comprising a fastening plate for connecting one of said side tarpaulins, said fastening plate being of two-part design and comprising a first part connected to said slider and a second part connected to an upper end of said one of said side tarpaulins, said first part and said second part being adjustable relatively to each other counter to a helical tension spring fitted at one end to said first part and at the other end to said second part, in each case by means of a partially annular end hook.

2. The folding top as recited in claim 1 further comprising bows supporting a tarpaulin roof covering, said bows being supported on said upper longitudinal flanges and displaceable in a longitudinal direction of said vehicle.

3. The folding top according to claim 2 wherein said bows bring about transverse bracing of the upper region of the folding-top frame when the folding top is closed.

4. The folding top according to claim 1 wherein said first part and said second part are guided on each other, wherein said first part is designed as a planar flat material blank provided with a central oblong recess, wherein said second part is of bracket-shaped design and is provided at least on one side with claws, and wherein said claws grip behind longitudinal edges of said oblong recess.

5. The folding top according to claim 4 wherein said second part has a back surface with an essentially triangular outline shape tapering from a top of the second part downwards.

6. The folding top according to claim 5 wherein said second part grips with an upper region around said first part and in the upper region is guided on said first part by a leg set perpendicular to a plane of said back surface in said oblong recess.

7. The folding top according to claim 6 wherein said oblong recess has a width over a length of said second part, the width essentially corresponding in width to a diameter of a tension spring, the recess being provided in its lower region with a widened portion.

8. The folding top according to claim 1 wherein said side tarpaulin is fastened in the region of a greatest width to a back surface of said second part by means of a pressure-distribution plate and a riveted joint comprising at least two rivets.

9. The folding top according to claim 1 wherein said hanging slider comprises a roller longitudinally displaceable in said running track.

10. The folding top according to claim 1 wherein said hanging slider comprises a first roller and a second roller, each of said rollers being at least partially spherical.

11. The folding top according to claim 1 wherein said commercial vehicle is selected from the group comprising vehicle bodies and containers.

12. A folding top for a commercial vehicle, comprising:
    a folding-top frame having upper longitudinal flanges spanning at least part of the length of a loading compartment of said vehicle, said frame being supported against a chassis of said vehicle via upwardly protruding supports and stakes, and
    side tarpaulins suspended by means of hanging sliders in a longitudinally displaceable manner on assigned running tracks of said upper longitudinal flanges, each of said hanging sliders comprising a fastening plate for connecting one of said side tarpaulins, said fastening plate being of two-part design and comprising a first part including a planar flat material having a central oblong recess connected to said slider and a second part including a bracket-shaped element having claws on at least one side part gripping behind longitudinal edges of said oblong recess, the first and second parts being connected to an upper end of said one of said side tarpaulins, said first part and said second part being guided on each other and adjustable relative to each other counter to a resisting means.

13. The folding top according to claim 12 wherein said resisting means comprises a tension spring.

14. The folding top according to claim 13 wherein said tension spring is designed as a helical spring and is fitted at one end to said first part and at the other end to said second part, in each case by means of a partially annular end hook.

15. The folding top according to claim 12 wherein said second part has a back surface with an essentially triangular outline shape tapering from a top of the second part downwards.

16. The folding top according to claim 15 wherein said second part grips with an upper region around said first part and in the upper region is guided on said first part by a leg set perpendicular to a plane of said back surface in said oblong recess.

17. The folding top according to claim 16 wherein said oblong recess has a width over a length of said second part, the width essentially corresponding in width to a diameter of a tension spring, the recess being provided in its lower region with a widened portion.

18. The folding top according to claim 12 wherein said side tarpaulin is fastened in the region of a greatest width to a back surface of said second part by means of a pressure-distribution plate and a riveted joint comprising at least two rivets.

19. The folding top according to claim 12 wherein said hanging slider comprises a roller longitudinally displaceable in said running track.

20. The folding top according to claim 12 wherein said commercial vehicle is selected from the group comprising vehicle bodies and containers.

21. A hanging slider for suspending a side-wall tarpaulin to an upper longitudinal flange of a commercial vehicle, said hanging slider comprising:
    a roller guided in a running track of said longitudinal flange, said roller comprising a first flat part;
    a fastening plate connected to said side-wall tarpaulin; and
    an expandable spring allowing a relative movement between said roller and said fastening plate, wherein an upper end of said spring is suspended to said first part of said roller and wherein said fastening plate is suspended to a lower end of said spring.

22. The hanging slider according to claim 21 wherein said expandable spring includes a helical spring having a partially annular hook at each end, and wherein the fastening plate includes claws gripping said first flat part for defining an axial guide mechanism.

* * * * *